(12) United States Patent
Salenbauch et al.

(10) Patent No.: US 6,758,452 B1
(45) Date of Patent: Jul. 6, 2004

(54) SUPPORT FOR A DRINKS HOLDER

(75) Inventors: Hermann Salenbauch, Bloomfield Hills, MI (US); Rainer Steiger, Landshut (DE); Roland Weismeier, Puchheim (DE); Alexander Klatt, Thousand Oaks, CA (US); Traci Angela Neist Vassallo, Redwood City, CA (US); John Raff, Menlo Park, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/111,108
(22) PCT Filed: Oct. 19, 2000
(86) PCT No.: PCT/EP00/10297
§ 371 (c)(1), (2), (4) Date: Nov. 12, 2002
(87) PCT Pub. No.: WO01/30608
PCT Pub. Date: May 3, 2001

(30) Foreign Application Priority Data

Oct. 22, 1999 (DE) .......................................... 199 50 889

(51) Int. Cl.[7] ................................................ A47K 1/08
(52) U.S. Cl. .................................... 248/311.2; 224/926
(58) Field of Search ............................ 248/311.2, 312, 248/310; 224/926, 282; 297/188.16, 188.19

(56) References Cited

U.S. PATENT DOCUMENTS

| 1,168,265 A | | 1/1916 | Kratz ....................... 248/145.6 |
| 5,054,733 A | | 10/1991 | Shields ........................ 248/313 |
| 5,071,096 A | | 12/1991 | Hartman et al. ............ 248/154 |
| 5,170,980 A | | 12/1992 | Burrows et al. .......... 248/311.2 |
| 5,671,877 A | * | 9/1997 | Yabuya ....................... 224/282 |
| 5,762,307 A | * | 6/1998 | Patmore ................... 248/311.2 |

FOREIGN PATENT DOCUMENTS

| DE | 2.302.891 | 7/1974 |
| DE | 195 46 126 A | 6/1997 |

* cited by examiner

Primary Examiner—Ramon O. Ramirez
(74) Attorney, Agent, or Firm—Crowell & Moring LLP

(57) ABSTRACT

A support for a drink holder has a receiving opening, the diameter of which can be modified by altering the position of lamella in an iris-like manner. The lamella are disposed on the circumference of the holder.

20 Claims, 4 Drawing Sheets

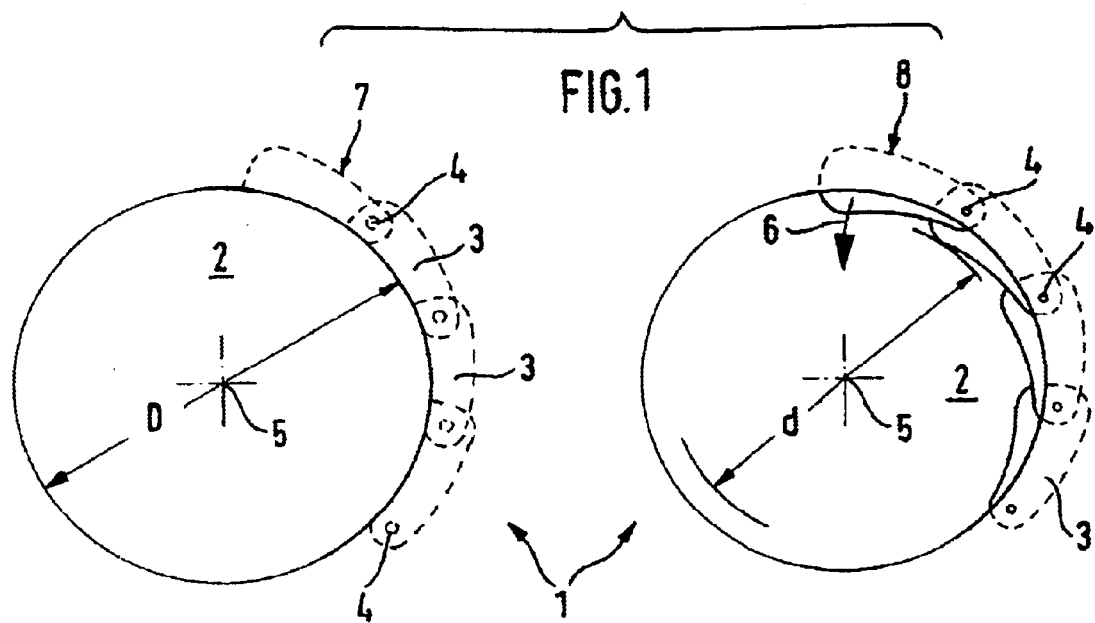
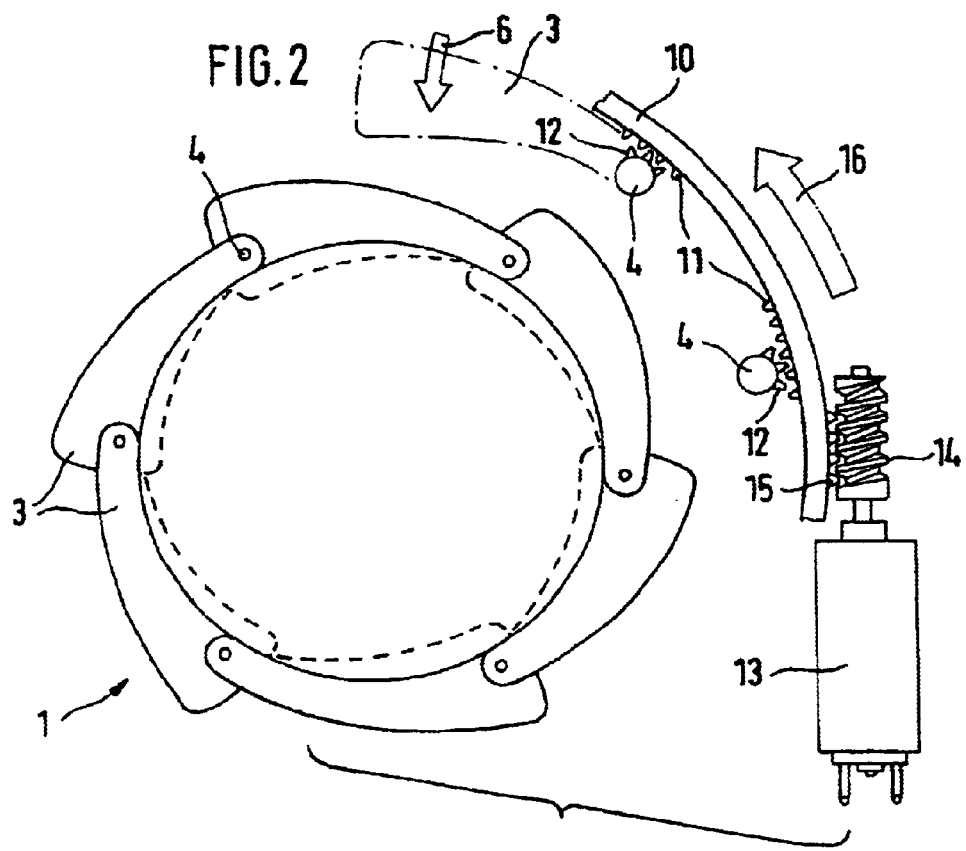

SUPPORT FOR A DRINKS HOLDER

BACKGROUND AND SUMMARY OF THE INVENTION

The invention relates to a holder for a beverage container or the like, as used mainly in motor vehicles. Such holders are known in many constructions and with different operating principles.

It is an object of the invention to further develop the known holders for a beverage container.

This object has been achieved by fixing the beverage container with a plurality of lamellae (or lamella-like elements) in the manner of an iris diaphragm in the receiving opening of the holder. As a result, a secure hold is achieved even when the diameters of the beverage container differ. In contrast to holders with springy holding elements, no mechanical resistance has to be overcome in the holder according to the invention when a beverage container is inserted, so that the operating forces are very low. Furthermore, the holder according to the invention is distinguished by stylistic clarity and technical simplicity, causing the manufacturing costs to be low.

BRIEF DESCRIPTION OF THE DRAWINGS

Other objects, advantages and novel features of the present invention will become apparent from the following detailed description of the invention when considered in conjunction with the accompanying drawings.

FIG. 1 is a schematic representation of the operating principle of a holder according to the invention in which the left-hand portion depicts the holder fully open and the right hand portion depicts the holder with an opening of reduced diameter;

FIG. 2 is a top view of a first embodiment of the invention on the left-hand side and a detailed view of the drive on the right-hand side;

DETAILED DESCRIPTION OF THE DRAWINGS

Figure 3:
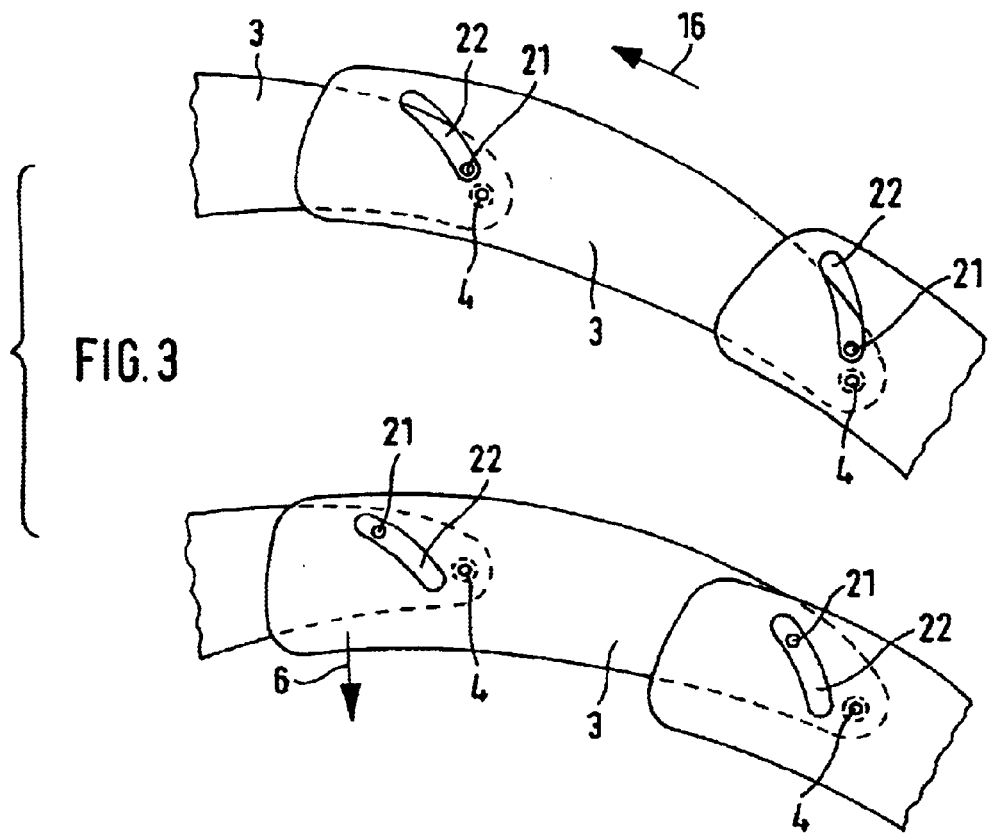
FIGS. 3 and 4 are a top view and a sectional view respectively of a second embodiment of the invention with the upper portion and lower portion of each figure respectively corresponding to each other.

A holder, which, as a whole, has the reference number 1, for a beverage container, which is not shown, has a receiving opening with an inside diameter D. On the edge of the receiving opening 2, a plurality of lamellae 3 are arranged whose longitudinal dimension follows the edge of the receiving opening 2. On their narrower end section 7, the lamellae 3 are swivellably disposed by way of hinge pins 4. The hinge pins 4 are situated on a circle which is concentric with respect to the center of the receiving opening 2.

As illustrated in the right part of the representation of FIG. 1, as a result of an inward movement (arrow 6) of the wider end section 8 of the lamellae 3, the inside diameter D of the receiving opening 2 is reduced to a smaller measurement d. Thereby, a beverage container having a diameter d placed in the receiving opening 2 is held in a reliable manner.

In the embodiment according to FIG. 2, the lamellae 3 are moved by means of a control ring 10. The control ring 10 has internal toothings 11 on its interior side opposite the area of the respective hinge pins 4 of the lamellae 3, which internal toothings 11 interact with corresponding external toothings 12 on the hinge pints 4 constructed as rotary shafts. The control ring 10 itself can be rotated in the circumferential direction of the holder 1 by way of a worm which is driven by an electric motor 13 and interacts with a worm gear toothing 15 on the outer circumference of the control ring 10. During a rotation in the direction of the arrow 16, the lamellae 3 swivel inward in the direction (arrow 6) of the receiving opening 2, whereby the inside diameter of the receiving opening 2 is reduced, as illustrated by broken lines. Inversely, as a result of a movement of the electric motor 13 in the opposite direction, the fixing of an inserted beverage container is released, in that the lamellae 3 are swivelled back 3 into their starting position illustrated by solid lines.

Figure 4:
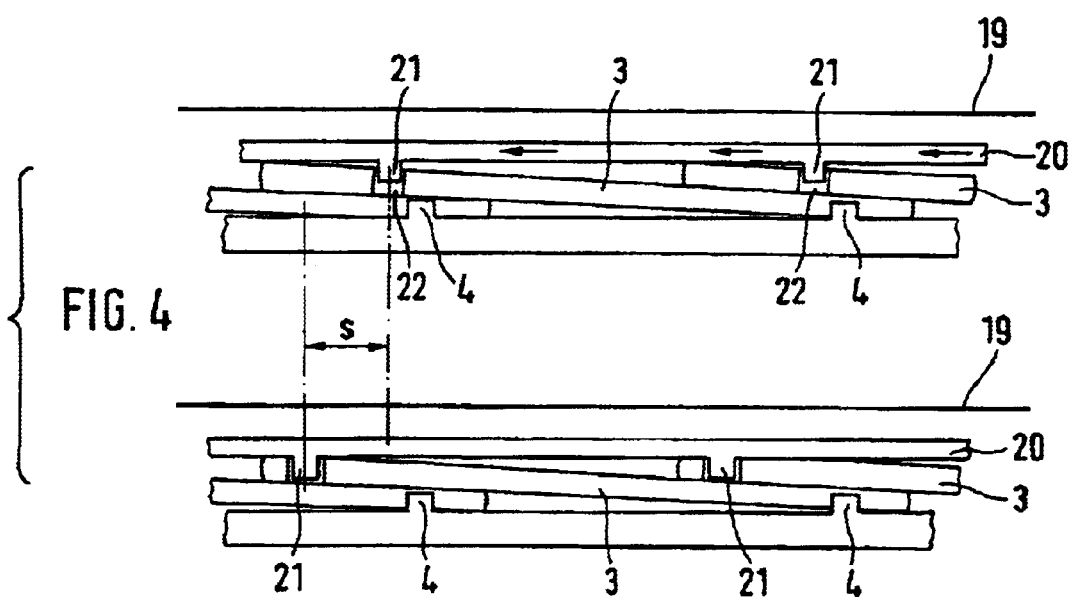

In the embodiment according to FIGS. 3 and 4, the holder 1 is, for example integrated in a center console of a motor vehicle 1. In the starting position showing in the upper portion of FIGS. 3 and 4, the lamellae 3 are arranged in a covered manner below a shell 19 of the center console, and, as illustrated in the developed sectional view of FIG. 4, are slightly inclined with respect to a horizontal plane in order to achieve a mutual overlapping. Above the lamellae 3, a control ring 20 is situated which has downward-directed driving devices 21 which engage in slot-shaped driving elements 22 of the lamellae 3. The shape and the alignment of the slots 22 in the lamellae 3, in conjunction with the driving devices 21, forms a connecting link guide which, when the control ring 20 is rotated in the direction of the arrow 16, generates a swivelling of the lamellae 3 in the direction of the arrow 6, that is, in the direction of a reduction of the diameter. In the sectional view of FIG. 4, the rotational movement 16 is illustrated as the adjusting path s.

Figure 5:
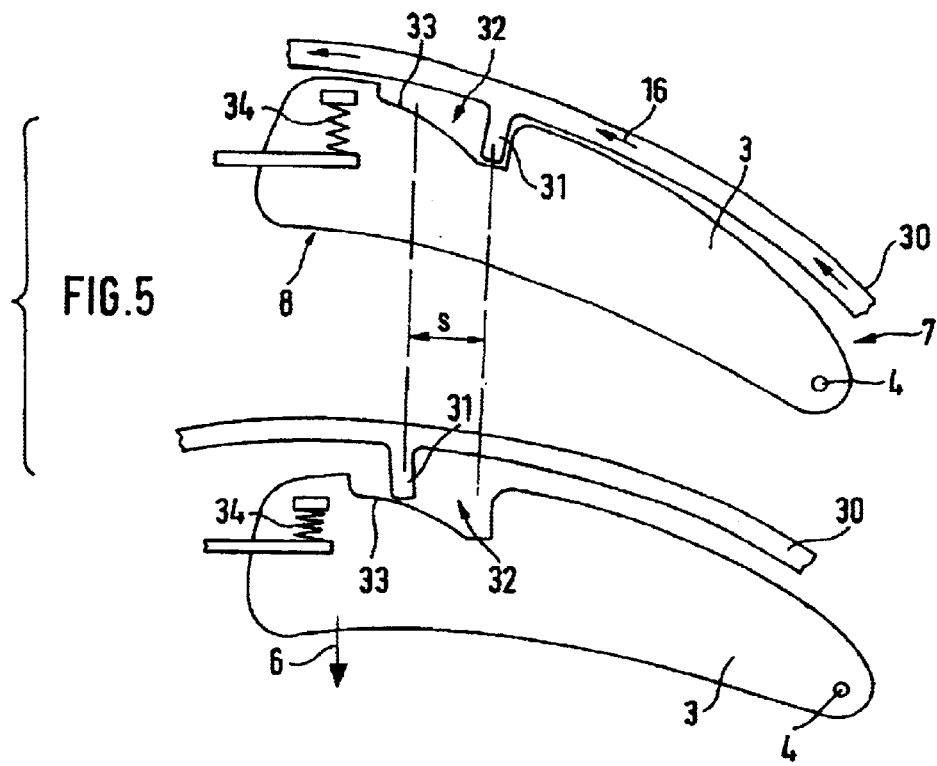
FIGS. 5 as well as 6 to 8 are additional embodiments of the invention.

The embodiment according to FIG. 5 operates with a control ring 30 which is arranged outside the lamellae 3 and has inward-directed control cams 31 which engage in recesses 32 which are arranged on the exterior circumferential surface of the lamellae 3. The recesses 32 are provided with stop faces 33 which extend in a curved manner to the outside toward the wider end section 8 of the lamellae 3. As illustrated in the lower part of the representation of FIG. 5, a rotation of the control ring 30 according to the arrow 16 causes an inward movement of the lamellae 3 according to the arrow 6, connected with a reduction of the diameter. Inversely, when the control ring 30 is rotated back by way of a restoring spring 34, the starting position is taken up again according to the upper part of the representation of FIG. 5. The adjusting path is again designated as s.

Figure 6:
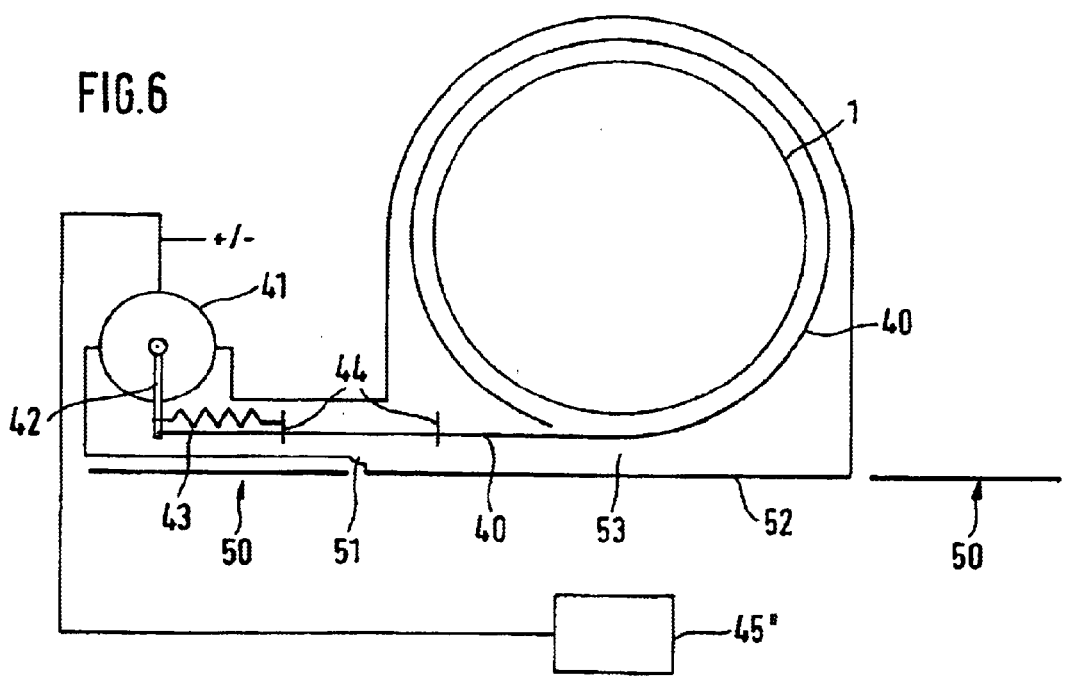
Figure 7:
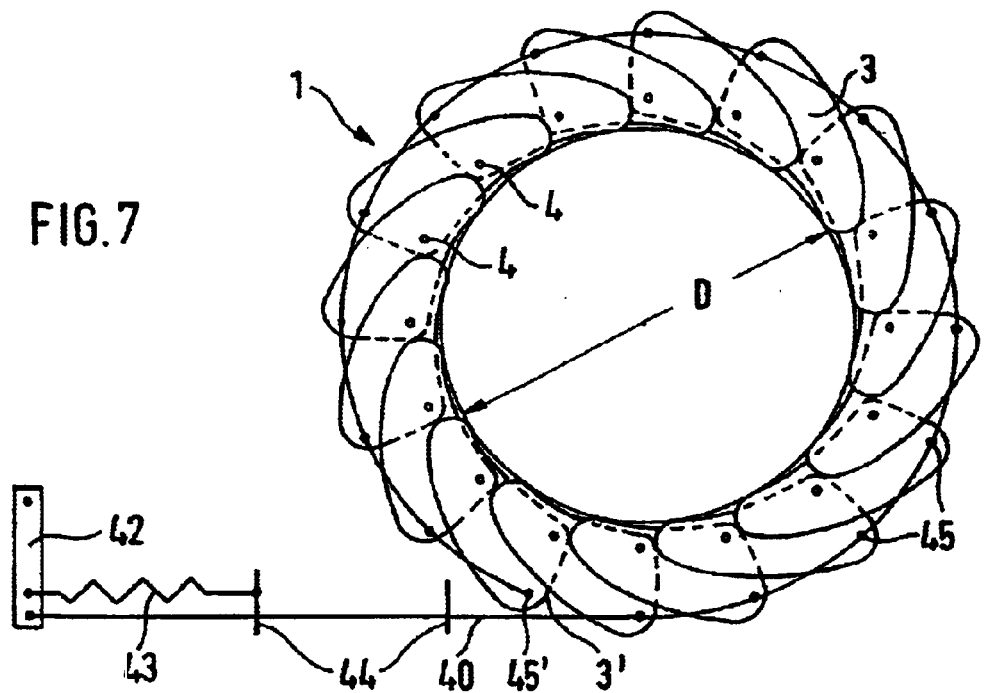
Figure 8:
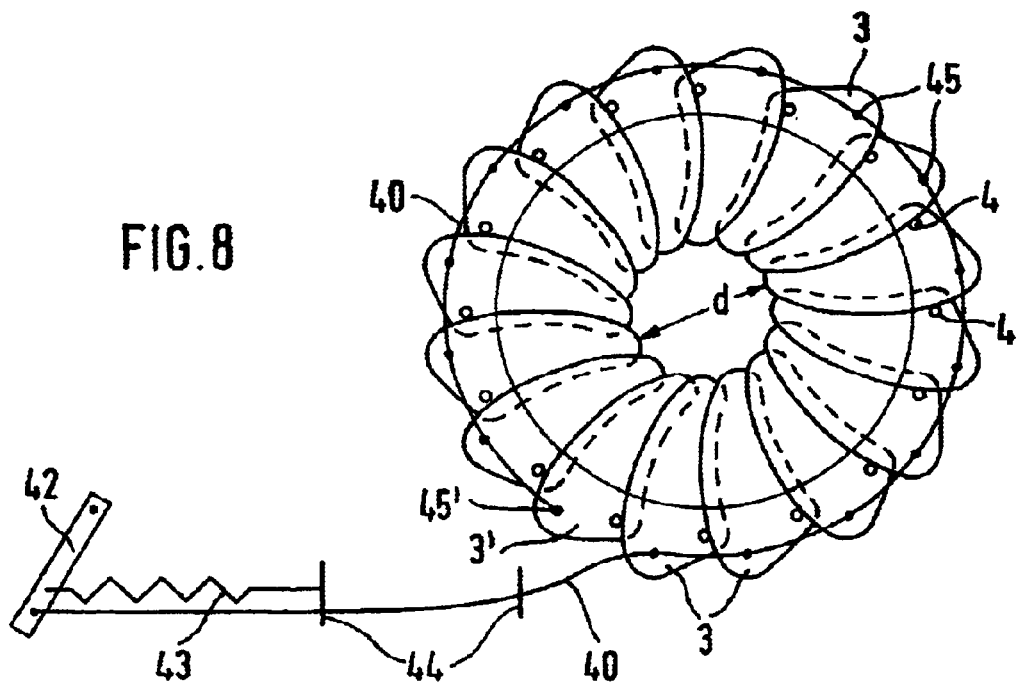

FIGS. 6 to 8 illustrate another embodiment of the invention, in which the lamellae 3 of the holder 1 are moved by way of a tension-proof and pressure-proof element, such as a spring steel wire. An electric motor 41, which moves a control lever 42 to which the spring steel wire is applied, is used as a drive. A restoring spring 43 ensures the return into the starting position. Guides 44 counteract a buckling of the spring steel wire 40. During a clockwise movement of the control lever 42, as illustrated in FIG. 8, the lamellae 3 of the holder 1 are swivelled about their hinge pins 4 such that the inside diameter is reduced from its original value D to a value d.

Basically, in the case of the holder 1 according to FIGS. 6 to 8, two embodiments can be used: If, as illustrated, a clear change of the inside diameter D or d of the receiving opening is desired, the spring steel wire 40 is rigidly connected only with the lamella 3' in point 45', while, in the case of the other lamellae 3, the points 45 are constructed as rotatable lugs, through which the spring steel wire 40 can slide in order to achieve a compensation of the different curve lengths between the individual points 45 in the open and the closed condition of the holder 1. As a result, a universal adaptation of the lamellae 3 is also obtained to a shape of the inserted beverage container which deviates from the circular shape. However, in the case of a design of the holder 1 for slight changes in the inside diameter D or d, it is possible to connect the spring steel wire 40 in points 45 with the lamellae 3.

As further illustrated in FIG. 6, the holder 1 is swivellably integrated in a center console 50 of a motor vehicle. The illustration shows the holder 1 in its swivelled-in position in which a facing 52 produces a uniform exterior appearance with the center console 50. Together with the holder 1, its drive (electric motor 41, control lever 42, restoring spring 43, guides 44) is also swivelled on a joint base plate 53 about a swivelling axis 52.

In addition to the illustrated swivellability of the holder, the latter can also be constructed in the shape of a drawer in a part of the interior fitting of the motor vehicle, with a pushed-in inoperative position and a pulled-out operative position. Furthermore, it is also possible to fixedly insert the holder 1 into a console of the motor vehicle. The holder 1 may be constructed as a series-produced part of the interior fittings or as an insertion part which can be retrofitted.

As indicated in FIG. 6, the controlling of the drive 41 of the holder 4 preferably takes place by a sensor 45". The sensor 45" can, for example, be constructed as an electric contact which is arranged below a depositing surface for a beverage container. When the depositing surface is displaced in the downward direction by the weight of an inserted beverage container against the prestressing of a spring, the electric contact is closed and the power supply for the electric drive 41 of the holder 1 is activated. Inversely, when the beverage container is removed, the electric contact is opened up again, connected with a signal for restoring the holder 1 into its starting position. As an alternative the controlling of the drive 41 can take place by way of an optical sensor 45" in the manner of a light barrier. In addition, instead of using a sensor 45", the drive 41 can also be started manually by way of a switch.

If the drive 41 is constructed as an electric motor, the switching-off of the electric motor 41, after the fixing of the inserted beverage container, can be implemented, for example, by a detection of the operating current of the electric motor 41 in that, in the case of a corresponding current rise because of the starting of the lamellae 3 at the beverage container, the power supply is interrupted. As a result of the self-locking design of a gearing on the electric motor 41, the clamping of the beverage container is automatically maintained. Instead of the self-locking, a detent device can also be provided.

The changing of the lamellae 3 from their inward-displaced position back into the starting position preferably takes place in a power-controlled manner, for example, by a movement of the electric motor in the opposite direction. The release of the beverage container can be accelerated by a spring which was tensioned when the holder 1 was activated.

In addition, embodiments of a holder 1 may also have no power drive and may have, for example, a manually operated slide which causes a movement of the lamellae 3 in the sense of a clamping or a releasing of the beverage container, with detent positions for the secure fixing of the beverage container.

For the adjustment of the lamellae 3, these are each connected with the drive, as illustrated in the embodiments according to FIGS. 2 to 5. In addition, it is conceivable to drive only one lamella 3 or only individual lamellae 3 and to couple the remaining lamellae 3 to the driven lamella (lamellae). The embodiment according to FIGS. 6 to 8 is a type of intermediate solution between these two possibilities, in which the spring steel wire 40 moves the lamellae 3 only in the radial direction.

What is claimed is:

1. Holder for a container, wherein the holder has a receiving opening for the insertion of a beverage container, and lamellae which are distributed along a circumference of the receiving opening for adjusting an inside diameter of the receiving opening and which are configured to be adjustable in the manner of an iris diaphragm.

2. Holder for a beverage container comprising lamella distributed along a circumference of a receiving opening in the holder for insertion of the container, the lamella being arranged and operative to reduce the circumference, wherein a drive is provided to swivel the lamella about their respective hinge pin arranged on an end section of each of the lamella.

3. Holder according to claim 2, wherein the hinge pin is rigidly connected with the lamella and the drive acts upon the hinge pin.

4. Holder according to claim 2, wherein the drive is configured to act upon the lamella outside its hinge pin.

5. Holder according to claim 4, wherein the drive has at least one driving device which is configured to interact with a driving element on a lamella.

6. Holder according to claim 5, wherein the drive has a control ring concentrically arranged with respect to the receiving opening, which control ring is situated axially above or below the hinge pins of the lamellae and via its driving devices in each case engages in driving elements at the lamellae constructed as connecting link guides.

7. Holder according to claim 2, wherein the drive has a toothed gearing with a toothing on at least one lamella.

8. Holder according to claim 7, wherein the drive has a control ring with an internal toothing arranged radially outside the lamellae and concentrically with respect to the receiving opening, which internal toothing is arranged to interact with at least one circular-arc-shaped external toothing situated on a lamella and facing the control ring such that a swivelling of the lamella takes place when the control ring is rotated.

9. Holder according to claim 2, wherein the drive has a control ring arranged concentrically with respect to the receiving opening and radially outside the receiving opening, which control ring has at least at least one control cam directed radially with respect to the center axis of the receiving opening, which control cam interacts such with a stop face at a lamella that a swivelling of the lamella takes place when the control ring is rotated.

10. Holder according to claim 2, wherein the drive has an electric motor which drives the control ring by way of a worm gear toothing.

11. Holder according to claim 2, wherein the drive has a tension-proof and pressure-proof element which is applied to at least one lamella and causes a swivelling of the lamella via its displacement.

12. Holder for container, comprising lamellae arranged along a circumference defining a receiving opening, with one end of each of the lamella being pivotable about a hinge pin located at or adjacent the circumference and another end of each of the lamella and being movable one of independently to adapt to at least one of different container shapes and different container diameters, and in unison with the respective free end of the other lamellae, into the area defined by the circumference.

13. Holder according to claim 12, wherein a slot and driving means is provided between adjacent ones of the lamella for forming a connecting link guide.

14. Holder according to claim 13, wherein adjacent lamella are overlapped by being inclined with respect to a horizontal plane.

15. Holder according claim 12, comprising Parmallae distributed along a circumference of a receiving opening in the holder for insertion of the container, the lamella being arranged and operative to reduce the circumference, wherein a drive a swivelling of the lamella in each case about their hinge pin is arranged on an end section.

16. Holder according claim 15, wherein the hinge pin is rigidly connected with the lamella and the drive acts upon the hinge pin.

17. Holder according to claim 15, wherein the drive is configured to act upon the lamella outside its hinge pin.

18. Holder according to claims 17, wherein the drive has at least one driving device which is configured to interact with a driving element on a lamella.

19. Holder according to claim 18, wherein the drive has a control ring concentrically arranged with respect to the receiving opening, which control ring is situated axially above or below the hinge pins of the lamella and via its driving devices in each case engages in driving elements at the lamella constructed as connecting link guides.

20. Holder according to claim 15, wherein the drive has a control ring with an internal toothing arranged radially outside the lamella and concentrically with respect to the receiving opening, which internal toothing is arranged to interact with at least one circular-arc-shaped external toothing situated on a lamella and facing the control ring such that a swivelling of the lamella takes place when the control ring is rotated.

* * * * *